(12) United States Patent
Ichien et al.

(10) Patent No.: US 11,159,067 B2
(45) Date of Patent: Oct. 26, 2021

(54) ROTOR AND MOTOR

(71) Applicant: Nidec Corporation, Kyoto (JP)

(72) Inventors: Akira Ichien, Kyoto (JP); Hiroshi Kitagaki, Kyoto (JP); Yuya Saito, Kyoto (JP); Chiharu Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 202 days.

(21) Appl. No.: 16/473,639

(22) PCT Filed: Dec. 22, 2017

(86) PCT No.: PCT/JP2017/046058
§ 371 (c)(1),
(2) Date: Jun. 26, 2019

(87) PCT Pub. No.: WO2018/123839
PCT Pub. Date: Jul. 5, 2018

(65) Prior Publication Data
US 2021/0135518 A1    May 6, 2021

(30) Foreign Application Priority Data
Dec. 28, 2016    (JP) .............................. JP2016-257146

(51) Int. Cl.
*H02K 1/27* (2006.01)
*H02K 5/173* (2006.01)
*H02K 16/02* (2006.01)

(52) U.S. Cl.
CPC ........... *H02K 1/278* (2013.01); *H02K 5/1732* (2013.01); *H02K 16/02* (2013.01)

(58) Field of Classification Search
CPC ....... H02K 1/278; H02K 5/1732; H02K 16/02
(Continued)

(56) References Cited

U.S. PATENT DOCUMENTS

2003/0201681 A1* 10/2003 Shimizu ................. H02K 1/278
                                                                        310/51
2008/0218007 A1    9/2008 Masuzawa et al.
(Continued)

FOREIGN PATENT DOCUMENTS

CN    101572448 A    11/2009
CN    106165259 A    11/2016
(Continued)

OTHER PUBLICATIONS

Official Communication issued in International Patent Application No. PCT/JP2017/046058, dated Mar. 6, 2018.

*Primary Examiner* — Terrance L Kenerly
(74) *Attorney, Agent, or Firm* — Keating & Bennett, LLP

(57) ABSTRACT

A rotor includes a first rotating body and a second rotating body. The first rotating body includes a first rotor core and first magnets arranged in a circumferential direction. An outer side surface of the first rotating body includes first outer side surfaces curved in a circular arc shape and arranged in the circumferential direction. The first outer side surface is an outer side surface of the first magnet or an outer side surface of the first rotor core. The second rotating body is positioned on a side lower than the first rotating body in an axial direction and includes a second rotor core and second magnets arranged in the circumferential direction. An outer side surface of the second rotating body includes second outer side surfaces curved in a circular arc shape and arranged in the circumferential direction.

19 Claims, 11 Drawing Sheets

(58) Field of Classification Search
USPC .................................................. 310/156.01
See application file for complete search history.

(56) References Cited

U.S. PATENT DOCUMENTS

| | | |
|---|---|---|
| 2009/0224619 A1 | 9/2009 | Okubo |
| 2013/0169099 A1* | 7/2013 | Saban .................... H02K 1/278 |
| | | 310/156.12 |
| 2017/0085143 A1 | 3/2017 | Tanaka et al. |

FOREIGN PATENT DOCUMENTS

| | | |
|---|---|---|
| JP | 2008-271652 A | 11/2008 |
| JP | 2016-167907 A | 9/2016 |

* cited by examiner

ROTOR AND MOTOR

CROSS REFERENCE TO RELATED APPLICATIONS

This is the U.S. national stage of PCT Application No. PCT/JP2017/046058, filed on Dec. 22, 2017, and priority under 35 U.S.C. § 119(a) and 35 U.S.C. § 365(b) is claimed from Japanese Application No. 2016-257146, filed Dec. 28, 2016; the entire disclosures of which are incorporated herein by reference.

1. FIELD OF THE INVENTION

The present invention relates to a rotor and a motor.

2. BACKGROUND

In a rotor used in a conventional brushless motor, a configuration has been adopted in which the rotor is divided into two parts in an axial direction, and permanent magnets of upper and lower rotors are disposed to be shifted in a circumferential direction to suppress cogging torque generated while the motor rotates. For example, a related art discloses a configuration in which a rotor is divided into two, which are a first divided body and a second divided body, in a longitudinal direction, and a plurality of sets of permanent magnets are disposed in left and right directions opposite to each other in the longitudinal direction. In a motor using an inner rotor having such a configuration, boundaries of magnetic poles of the permanent magnet are artificially inclined to suppress cogging of the motor.

However, in a rotor having the above-described configuration, there are problems such as, since permanent magnets on a surface of an inner rotor have a special shape, the flow of magnetic flux is complicated and thus it is difficult to obtain suitable magnetic characteristics.

SUMMARY

According to a first example embodiment of the present disclosure, a rotor includes a first rotating body and a second rotating body arranged along a central axis extending in a vertical direction. The first rotating body includes a first rotor core having a cylindrical shape with the central axis as a center thereof and a plurality of first magnets arranged in a circumferential direction. An outer side surface of the first rotating body includes a plurality of first outer side surfaces curved in a circular arc shape in a plan view and arranged in the circumferential direction. The first outer side surface is an outer side surface of the first magnet or an outer side surface of the first rotor core. The second rotating body is positioned on a side lower in an axial direction than the first rotating body and includes a second rotor core having a cylindrical shape with the central axis as a center thereof and a plurality of second magnets arranged in the circumferential direction. An outer side surface of the second rotating body includes a plurality of second outer side surfaces curved in a circular arc shape in a plan view and arranged in the circumferential direction. The second outer side surface is an outer side surface of the second magnet or an outer side surface of the second rotor core, and a curvature radius of the first outer side surface is different from a curvature radius of the second outer side surface.

According to the first example embodiment of the present disclosure, torque ripples generated while driving a motor including a rotor are reduced by making the shapes of curvature radii of a first outer side surface and a second outer side surface different from each other. Further, when the first outer side surface and the second outer side surface are outer circumferential surfaces of magnets, the shapes of the magnets become relatively simple so that a configuration is able to be provided in which the flow of magnetic flux is prevented from becoming complicated, and suitable magnetic characteristics are able to be easily obtained. Meanwhile, when the first outer side surface and the second outer side surface are outer circumferential surfaces of rotor cores, the shapes of the magnets can be made to be simple, such as a rectangular parallelepiped shape, so that a configuration is able to be provided in which suitable magnetic characteristics are able to be easily obtained.

The above and other elements, features, steps, characteristics and advantages of the present disclosure will become more apparent from the following detailed description of the example embodiments with reference to the attached drawings.

DETAILED DESCRIPTION

Figure 1:
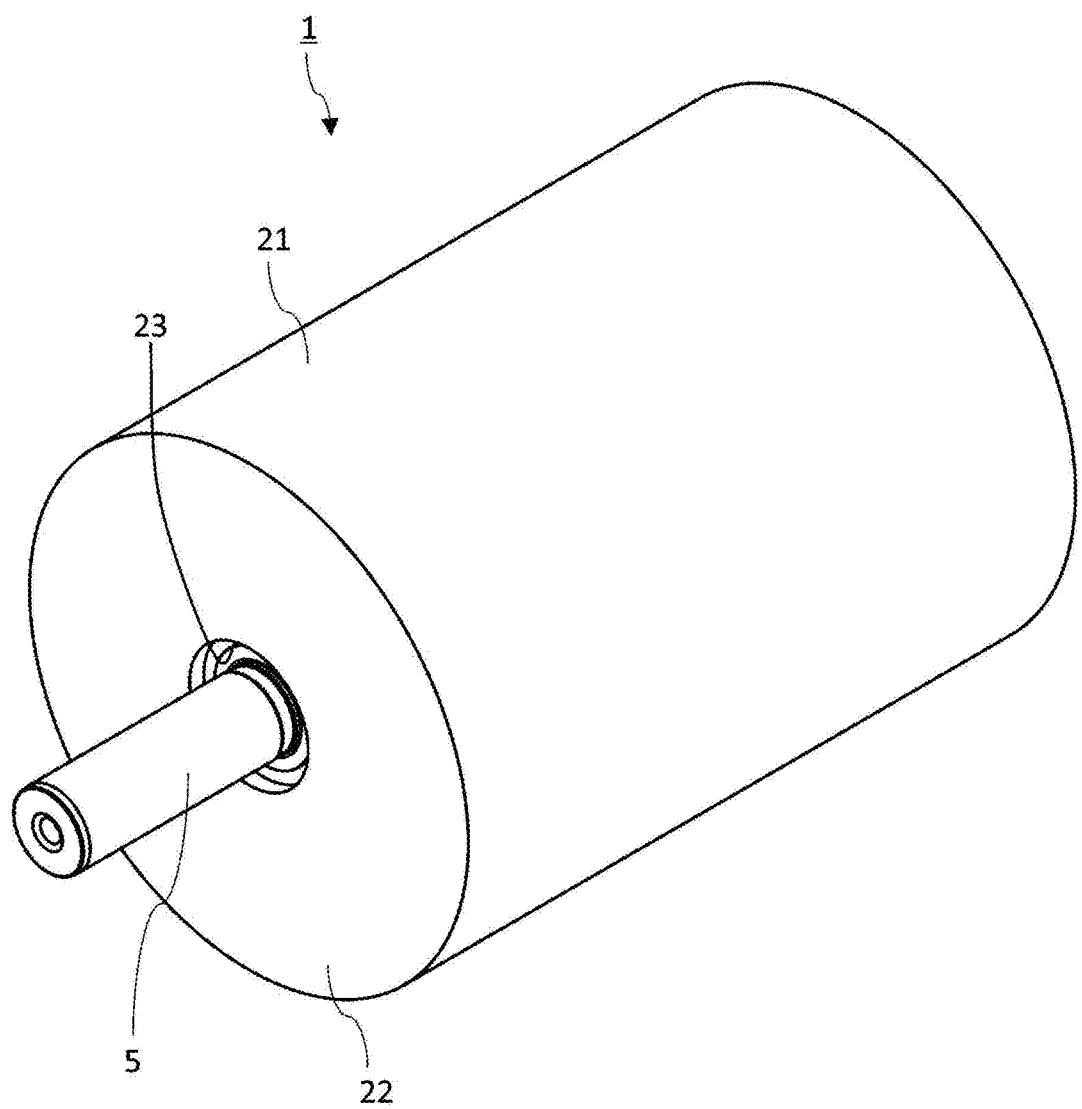
FIG. 1 is an external perspective view of a motor according to an example embodiment of the present disclosure.

Hereinafter, example embodiments and modified example embodiments of the present disclosure will be described with reference to the drawings. However, the example embodiment and the modified examples described below are merely examples of the present invention and are not intended to be construed as limiting the technical scope of the present invention. In each drawing, when the same components are denoted by the same reference numerals, the description thereof may be omitted.

In the following description, a central axis of rotation of a rotor in a motor is defined as "C". The direction in which the central axis C extends is defined as a "vertical direction". However, the vertical direction in the present specification is a term used merely for the purpose of explanation and does not limit an actual positional relationship or direction. That is, a gravity direction is not necessarily a downward direction. Further, in the present specification, a direction parallel to a rotation axis of the motor is referred to as an "axial direction", a direction orthogonal to the rotation axis of the motor is referred to as a "radial direction", and a direction along a circular arc about the rotation axis of the motor is referred to as a "circumferential direction", respectively.

Further, in the present specification, "extending in the axial direction" includes a state of extending in a direction inclined in a range of fewer than 45 degrees with respect to the axial direction in addition to a state of strictly extending in the axial direction. Likewise, in the present specification, "extending in the radial direction" includes a state of extending in a direction inclined in a range of fewer than 45 degrees with respect to the radial direction in addition to a state of strictly extending in the radial direction. Moreover, the term "straight line" includes a straight line segment without unevenness, and also a line segment with some unevenness or curvature. Also, the term "the same" or "equal" includes not only a component which is completely the same but also a component having some difference in a degree sufficient to achieve the gist of the present invention.

1. Example Embodiment

Figure 2:
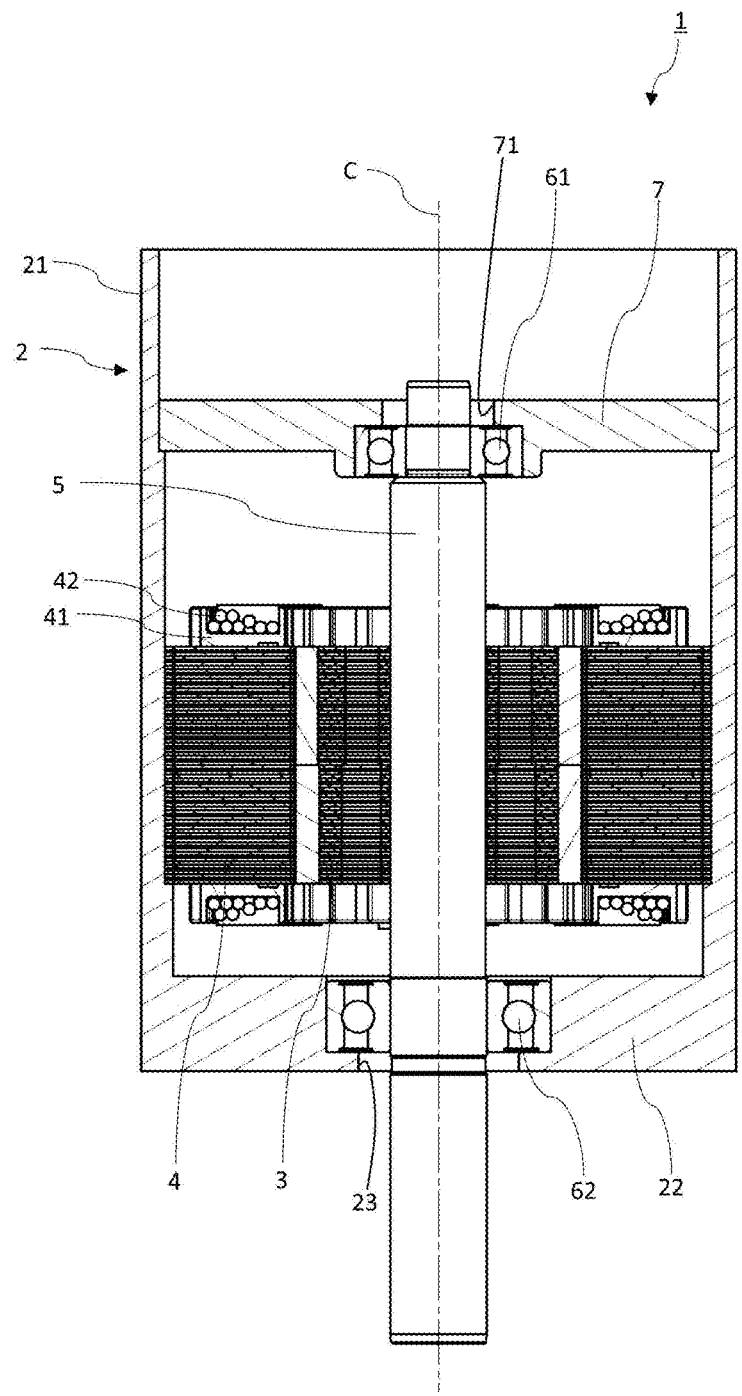
FIG. 2 is a cross-sectional view of the motor.

A motor of the present example embodiment is used as, for example, a motor for electric power steering. FIG. 1 is an external perspective view of a motor 1 according to the present example embodiment. FIG. 2 is a cross-sectional view of the motor 1. As shown in FIGS. 1 and 2, the motor 1 includes a housing 2, a rotor 3, a stator 4, a shaft 5, an upper bearing 61, a lower bearing 62, and a bearing holder 7. As shown in FIG. 1, a housing cylinder 21, a housing bottom 22, and the shaft 5 are visually recognized from the outside.

As shown in FIG. 2, the housing 2 includes the housing cylinder 21 and the housing bottom 22. The housing 2 is made of a conductive material such as metal. The housing 2 accommodates the rotor 3, the stator 4, the shaft 5, the upper bearing 61, the lower bearing 62, and the bearing holder 7. Here, the term "accommodate" includes both a case in which the whole of an object to be accommodated is positioned inside the housing and a case in which a part of the object to be accommodated is positioned inside the housing. The housing 2 is open upward.

The housing cylinder 21 has a cylindrical shape with a central axis C as a center thereof. The bearing holder 7 having a substantially circular plate shape is disposed in the housing cylinder 21. An inner circumferential surface of the housing cylinder 21 is in contact with an outer circumferential surface of the bearing holder 7 and an outer circumferential surface of the stator 4. The housing cylinder 21 is fixed to the bearing holder 7 and the stator 4.

Further, the housing cylinder 21 may not necessarily have the cylindrical shape and may have any shape, such as a box shape, as long as the stator 4 and the bearing holder 7 can be fixed to the inner circumferential surface thereof. Further, the housing cylinder 21 may have a shape combining a cylindrical shape and other shapes such as a box shape. The inner circumferential surface of the housing cylinder 21 may not be in contact with the stator 4 and the bearing holder 7 on the entire circumference, and only a part of the inner circumferential surface may be in contact with the stator 4 and the bearing holder 7. Further, it is not necessary to have a configuration in which the housing cylinder 21 and the bearing holder 7 are in contact with each other, and for example, a configuration in which the bearing holder 7 is disposed on an upper side of the housing cylinder 21 may be adopted. In other words, the housing 2 may not necessarily accommodate the bearing holder 7.

The housing bottom 22 is disposed under the stator 4. The housing bottom 22 supports the lower bearing 62. The housing bottom 22 includes an output shaft hole 23 which passes through the housing bottom 22 in an axial direction and through which the shaft 5 is inserted and passed.

Further, in the present example embodiment, the housing 2 is a separate member from the bearing holder 7. The housing cylinder 21 and the bearing holder 7 may be a single member, and the housing bottom 22 may be a separate member. Further, each of the housing cylinder 21, the housing bottom 22, and the bearing holder 7 may be a separate member.

The bearing holder 7 has a circular plate shape. The bearing holder 7 is disposed above the stator 4. The bearing holder 7 includes an opening 71 around the central axis C. The opening 71 is a through-hole passing through the bearing holder 7 in the axial direction. At least a part of the shaft 5 is positioned on an inner side of the opening 71. The bearing holder 7 supports the upper bearing 61. The outer circumferential surface of the bearing holder 7 is in contact with the inner circumferential surface of the housing cylinder 21, and the bearing holder 7 is fixed to the housing cylinder 21. In the present example embodiment, the bearing holder 7 is fixed to the housing cylinder 21 by shrink fitting. Further, the bearing holder 7 may be fixed to the housing cylinder 21 by other methods such as press fitting.

The stator 4 is disposed inside the housing 2 and outside the rotor 3 in a radial direction so as to face the rotor 3. That is, the stator 4 surrounds the rotor 3 in a circumferential direction. The stator 4 includes a stator core (not shown), an insulator 41, and a coil 42. The stator core is formed of a laminated steel plate in which electromagnetic steel plates are laminated in the axial direction. In the present example embodiment, the stator core has an annular shape with the central axis C as a center thereof. The insulator 41 is formed of an insulator such as resin and attached to the stator core. The coil 42 is formed by a conducting wire wound around the stator core through the insulator 41. The outer circumferential surface of the stator 4 is fixed to an inner circumferential surface of the housing 2.

The upper bearing 61 and the lower bearing 62 of the motor 1 are ball bearings. The upper bearing 61 and the lower bearing 62 rotatably support the shaft 5 in the circumferential direction with the central axis C as a center thereof. The upper bearing 61 is supported by the bearing holder 7. The lower bearing 62 is supported by the housing bottom 22. The upper bearing 61 and the lower bearing 62 may be other types of bearings than ball bearings.

In the present specification, the upper bearing 61 and the lower bearing 62 are collectively referred to as "bearings". That is, the bearings, which include the upper bearing 61 and the lower bearing 62, rotatably support the shaft 5 and the rotor 3.

Figure 3:
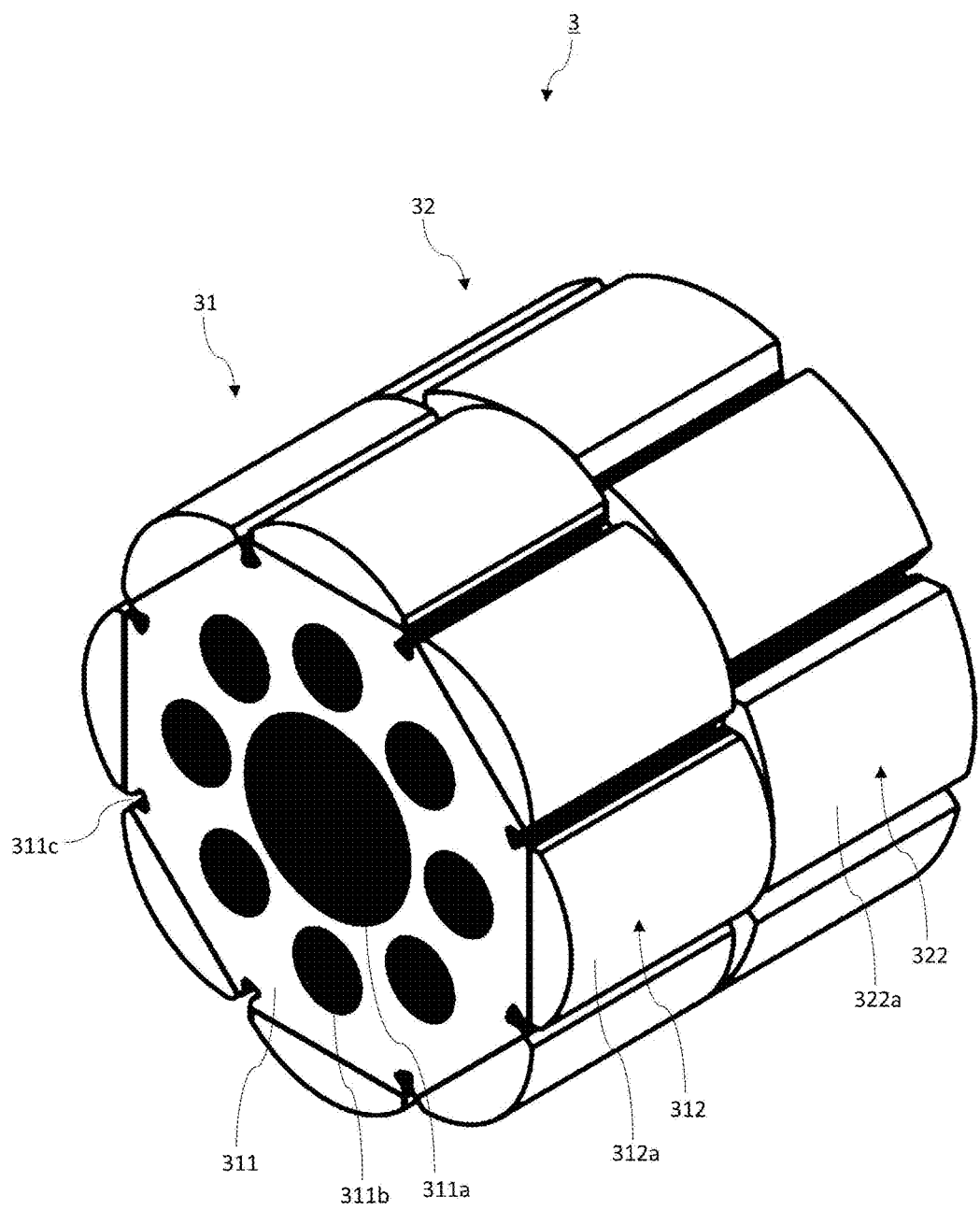
FIG. 3 is a perspective view of a rotor in an example embodiment of the present disclosure.

The rotor 3 is arranged along the central axis C extending in a vertical direction and is attached to an outer circumference of the shaft 5. FIG. 3 is a perspective view of the rotor 3 of the present example embodiment.

As shown in FIG. 3, the rotor 3 includes a first rotating body 31 and a second rotating body 32 arranged along the central axis C. The first rotating body 31 is positioned above the second rotating body 32 in the axial direction, and the second rotating body 32 is positioned below the first rotating body 31 in the axial direction. The first rotating body 31 and the second rotating body 32 may be in contact with each other or may be slightly separated from each other. However, when each of the first rotating body 31 and the second rotating body 32 is held by a holder, the first rotating body 31 and the second rotating body 32 may necessarily be separated by the holder. The holder is made of resin. Further, instead of the holder, a configuration in which the first rotating body 31 and the second rotating body 32 are held by a mold using resin may be adopted.

The first rotating body 31 includes a first rotor core 311, and the second rotating body 32 includes a second rotor core (not shown). Further, the first rotating body 31 includes a first magnet 312, and the second rotating body 32 includes a second magnet 322. The first rotating body 31 faces the second rotating body 32 in the axial direction. Each of the first magnet 312 and the second magnet 322 is a permanent magnet. In the present example embodiment, since the second rotor core has the same shape as the first rotor core, an illustration thereof will be omitted.

Hereinafter, the first rotating body 31 and the second rotating body 32 will be described in detail. However, since the first rotating body 31 and the second rotating body 32 have similar configurations, for the common parts of the first rotating body 31 and the second rotating body 32, only one rotating body is specifically described, and a detailed description of the other rotating body may be omitted.

The first rotor core 311 of the first rotating body 31 and the second rotor core of the second rotating body 32 include shaft through holes 311a at positions including the central axis C. The first rotor core 311 of the first rotating body 31 and the second rotor core of the second rotating body 32 include a plurality of through holes 311b at outsides of the shaft through holes 311a in the radial direction. The number of the plurality of through holes 311b is eight, which is the same as the number of circumferential surfaces of the first rotor core 311. The first rotor core 311 has a cylindrical shape, for example, a polygonal prism shape. A cross section of the first rotor core 311 in a plane perpendicular to the axial direction has, for example, a polygonal shape such as a regular octagonal shape. However, the first rotor core 311 is not necessarily limited to the polygonal prism shape and may have a cylindrical shape or other shapes. In the present example embodiment, since the second rotor core has the same shape as the first rotor core, the illustration thereof is omitted.

Positions of the first rotating body 31 and the second rotating body 32 in the circumferential direction are deviated from each other. Accordingly, although the shaft through holes 311a of the first rotor core 311 and the second rotor core communicate with each other in the first rotating body 31 and the second rotating body 32, the through holes 311b do not necessarily communicate with each other in the first rotating body 31 and the second rotating body 32. Further, an apex of the first magnet 312 of the first rotating body 31 and an apex of the second magnet 322 of the second rotating body 32 are at different positions in the circumferential direction. Specifically, the first magnet 312 and the first rotor core 311 of the first rotating body 31 are deviated from the second magnet 322 and the second rotor core of the second rotating body 32 by a phase angle θ in the circumferential direction. Further, the fact that the positions of the first rotating body 31 and the second rotating body 32 in the circumferential direction are deviated from each other may be expressed as "having skew". Cogging torque generated while driving the motor 1 having the rotor 3 may be suppressed by such a configuration. Further, since a configuration may be provided in which phases of torque ripples included in the torques generated from the first rotating body 31 and the second rotating body 32 are likely to cancel each other out, the torque ripples may be reduced more effectively.

Here, when the rotor 3 rotates about the central axis, the first magnet 312 or the second magnet 322 reaching a predetermined position in the circumferential direction first is referred to as "one side" in the circumferential direction, and the first magnet 312 or the second magnet 322 subsequently reaching the predetermined position in the circumferential direction is referred to as "the other side" in the circumferential direction. Also, in the present specification, for convenience of description, a predetermined angle at which the second rotating body deviates to one side in the circumferential direction with respect to the first rotating body is referred to as an "advance side", and a predetermined angle deviated to the other side in the circumferential direction is referred to as a "retard side".

In one rotational direction of the rotor 3, a positional deviation of the first rotating body 31 with respect to the second rotating body 32 in the circumferential direction is smaller than the positional deviation of the first rotating body 31 with respect to the second rotating body 32 in the circumferential direction in a direction opposite to the one rotational direction. That is, the first magnet 312 of the first rotating body 31 is one side in the circumferential direction with respect to the second magnet 322 of the second rotating body 32. In other words, the second magnet 322 of the second rotating body 32 is the other side in the circumferential direction with respect to the first magnet 312 of the first rotating body 31.

In the first rotating body 31, a plurality of first magnets 312 arranged in the circumferential direction are disposed on an outer circumferential surface of the first rotor core 311. As shown in FIG. 3, the plurality of first magnets 312 are disposed on the outer circumferential surface of the first rotor core 311 having, for example, a polygonal shape. In the rotor 3 of FIG. 3, the number of first magnets 312 is eight. Likewise, in the second rotating body 32, a plurality of second magnets 322 arranged in the circumferential direction are disposed on an outer circumferential surface of the second rotor core. The first magnets 312 and the second magnets 322 have the same number. That is, the number of second magnets 322 is eight.

Figure 4:
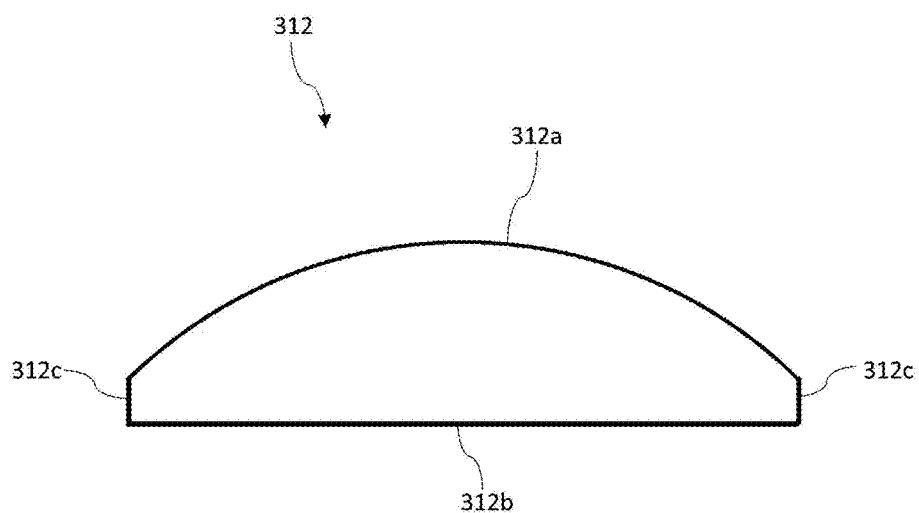
FIG. 4 is a cross-sectional view of a first magnet in the example embodiment.
Figure 5:
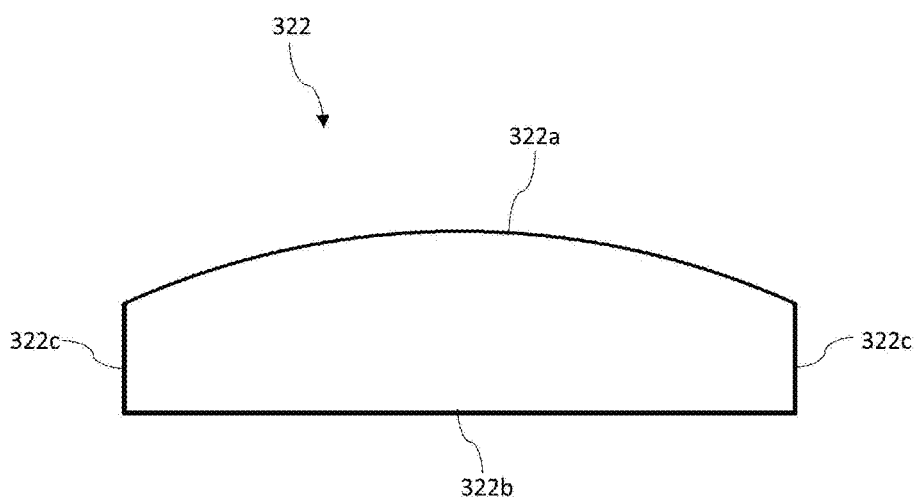
FIG. 5 is a cross-sectional view of a second magnet in the example embodiment of the present disclosure.

FIG. 4 is a cross-sectional view of the first magnet 312 in a plane orthogonal to the axial direction. FIG. 5 is a cross-sectional view of the second magnet 322 in a plane orthogonal to the axial direction.

As shown in FIG. 4, the first magnet 312 includes a first outer side surface 312a, a first inner side surface 312b, and first connection surfaces 312c. The first magnet 312 is in contact with the first rotor core 311 on the first inner side surface 312b. The first inner side surface 312b is formed as a straight line and is in contact with the outer circumferential surface of the first rotor core 311. The first connection surfaces 312c are positioned on both sides of the first outer side surface 312a in the circumferential direction and are formed as straight lines. The first connection surface 312c is positioned between the first magnets 312 arranged adjacent to each other. The first magnets 312 arranged adjacent to each other are spaced apart from the first connection surface 312c.

The first outer side surface 312a of the first magnet 312 is curved in a circular arc shape when viewed in plan in a plane orthogonal to the axial direction. That is, the first outer side surface 312a has a curved surface having a circular arc-shaped cross-section. The first outer side surface 312a has a predetermined curvature radius R1.

As shown in FIG. 5, the second magnet 322 has a second outer side surface 322a, a second inner side surface 322b, and second connection surfaces 322c. The second magnet 322 is in contact with the second rotor core on the second inner side surface 322b. The second inner side surface 322b is formed as a straight line and is in contact with the outer circumferential surface of the second rotor core. The second connection surfaces 322c are positioned on both sides of the second outer side surface 322a in the circumferential direction and are formed as straight lines. In the second magnets 322 arranged adjacent to each other, the second connection surfaces 322c are positioned facing each other. In the second magnets 322 arranged adjacent to each other, the second connection surfaces 322c are spaced apart from each other.

The second outer side surface 322a of the second magnet 322 is curved in a circular arc shape when viewed in plan in a plane orthogonal to the axial direction. That is, the second outer side surface 322a has a curved surface having a circular arc-shaped cross-section. The second outer side surface 322a has a predetermined curvature radius R2.

As described above, since the first magnet 312 and the second magnet 322 respectively include the first outer side surface 312a and the second outer side surface 322a each having a curved shape in a circular arc shape, the flow of magnetic flux while the motor 1 rotates may be prevented from becoming complicated as compared with a magnet whose outer circumferential surface has a special shape. Thus, a configuration in which suitable magnetic characteristics may be easily obtained while the motor 1 rotates may be provided.

The curvature radius R1 of the first outer side surface 312a of the first magnet 312 is different from the curvature radius R2 of the second outer side surface 322a of the second magnet 322. Specifically, the curvature radius R1 of the first outer side surface 312a is smaller than the curvature radius R2 of the second outer side surface 322a. That is, the second outer side surface 322a is more gently curved than the first outer side surface 312a. Further, since the first outer side surface 312a and the second outer side surface 322a have the same distance from the outermost circumference positions thereof to the central axis C, the second connection surface 322c is longer than the first connection surface 312c.

In a plane perpendicular to the axial direction, a curvature center of the first outer side surface 312a of the first magnet 312, a curvature center of the second outer side surface 322a of the second magnet 322, and the central axis C are at different positions. Here, a distance R from the central axis C to the outermost circumference position of the first rotor core 311, the curvature radius R1 of the first outer side surface 312a, and the curvature radius R2 of the second outer side surface 322a are different from each other. In the present example embodiment, the distance R from the central axis C to the outermost circumference position of the first rotor core 311 is greater than the curvature radius R1 of the first outer side surface 312a and smaller than the curvature radius R2 of the second outer side surface 322a. With such a configuration, it is easy to make the phase of the torque ripple generated in the second rotating body 32 opposite to the phase of the torque ripple generated in the first rotating body 31. Thus, the configuration in which the torque ripples are reduced is facilitated. Further, the magnitude relationship between the distance R, the curvature radius R1, and the curvature radius R2 is not limited thereto.

The first rotor core 311 of the first rotating body 31 and the second rotor core of the second rotating body 32 have grooves 311c notched inward in the radial direction. The grooves 311c are positioned between the first magnets 312 and between the second magnets 322, which are arranged adjacent to each other in the circumferential direction, and extend in the axial direction in which the first rotor core 311 is stacked. The first rotating body 31 and the second rotating body 32 are held by holders (not shown) inserted into the grooves. For example, the first rotor core 311 and the first magnet 312 of the first rotating body 31 are stably held by the holders even during rotation.

The first magnet 312 may have a shape including the first outer side surface 312a and the first inner side surface 312b and not including the first connection surface 312c. Likewise, the second magnet 322 may have a shape including the second outer side surface 322a and the second inner side surface 322b and not including the second connection surface 322c.

Further, when the outer circumferential surface of the first rotor core 311 has a curved shape, such as a circular arc shape, in a plan view, the first inner side surface 312b of the first magnet 312 may not be formed as a straight line but may be formed to be curved along the outer circumferential surface of the first rotor core 311 such as an arcuate form or the like. Also, the first inner side surface 312b may have a shape having a straight line portion and a curved portion.

<Torque Generated During Rotation of Rotor>

When the motor 1 is driven, the coil 42 is energized by power supplied from the outside, and torque in the circumferential direction is generated between the stator 4 and the rotor 3 by a magnetic force and an electromagnetic force. By this torque, the rotor 3 rotates relatively with respect to the stator 4 about the central axis C. When the rotor 3 rotates with respect to the stator 4, the shaft 5 to which the rotor 3 is attached rotates, and driving power is output from an output terminal of the shaft 5.

When the motor 1 of the conventional configuration rotates, cogging torque may be generated depending on a rotation angle of the rotor 3 with respect to the stator 4, and thus there is a case in which it is difficult to rotate smoothly. Also, there is a case in which the generated torque may include torque ripples, and thus the torque may not be stable.

Meanwhile, the rotor 3 has the configuration in which the curvature radius of the first outer side surface 312a of the first rotating body 31 is different from the curvature radius of the second outer side surface 322a of the second rotating body 32. Thus, it is possible to design such that the phase of the torque ripple generated in the first rotating body 31 is opposite to the phase of the torque ripple generated in the second rotating body 32. By making the phases of the torque ripples generated in the first rotating body 31 and the second rotating body 32 opposite to each other, the torque ripples of the first rotating body 31 and the second rotating body 32 may be canceled. That is, it is possible to reduce the torque ripple generated while driving the motor 1 including the rotor 3. Also, when the torque ripple generated in the first rotating body 31 and the torque ripple generated in the second rotating body 32 may be canceled, the torque ripples generated in the first rotating body 31 and the second rotating body 32 do not necessarily have to be opposite to each other.

Further, in the rotor 3, since the first rotating body 31 is deviated from the second rotating body 32 in the circumferential direction, the cogging torque generated while driving the motor 1 including the rotor 3 may be reduced. Also, since it is easy to design such that the phase of the torque ripples generated in the first rotating body 31 and the phase of the torque ripple generated in the second rotating body 32 are opposite to each other, the torque ripple may be reduced more effectively.

Meanwhile, a rotating body having an outer side surface with a small curvature radius has low cogging torque and excellent robustness. Thus, by disposing rotating bodies having outer side surfaces with a small curvature radius on one side in the circumferential direction in a rotational direction, a configuration having low cogging torque and excellent robustness may be provided.

In the rotor 3, in the rotational direction, the curvature radius R1 of the first outer side surface 312a of the first magnet 312 on the one side in the circumferential direction is smaller than the curvature radius R2 of the second outer side surface 322a of the second magnet 322 on the other side in the circumferential direction. Such a disposition may reduce the cogging torque. Also, the torque ripples may be effectively reduced.

In the case of the above-described configuration, there is a variation in torque ripples generated between the case in which the rotor 3 rotates in one direction with respect to the stator 4 and the case in which the rotor 3 rotates in a reverse direction with respect to the stator 4. Accordingly, the present invention is particularly effectively applied to a motor rotating in one direction.

2. Modified Examples

The motor 1 is not limited to the above-described example embodiment, and various forms that can be considered from the above-described example embodiments are also included. For example, the motor 1 may be configured as modified examples below. In the modified examples below, descriptions of the same configurations and functions as those of the example embodiment will be omitted, and differences from the example embodiment will be mainly described. Further, in a configuration having a plurality of rotating bodies, a description about one rotating body may be given, and a description of other rotating bodies may be omitted for portions having features common to the rotating bodies.

2-1. First Modified Example

Figure 6:
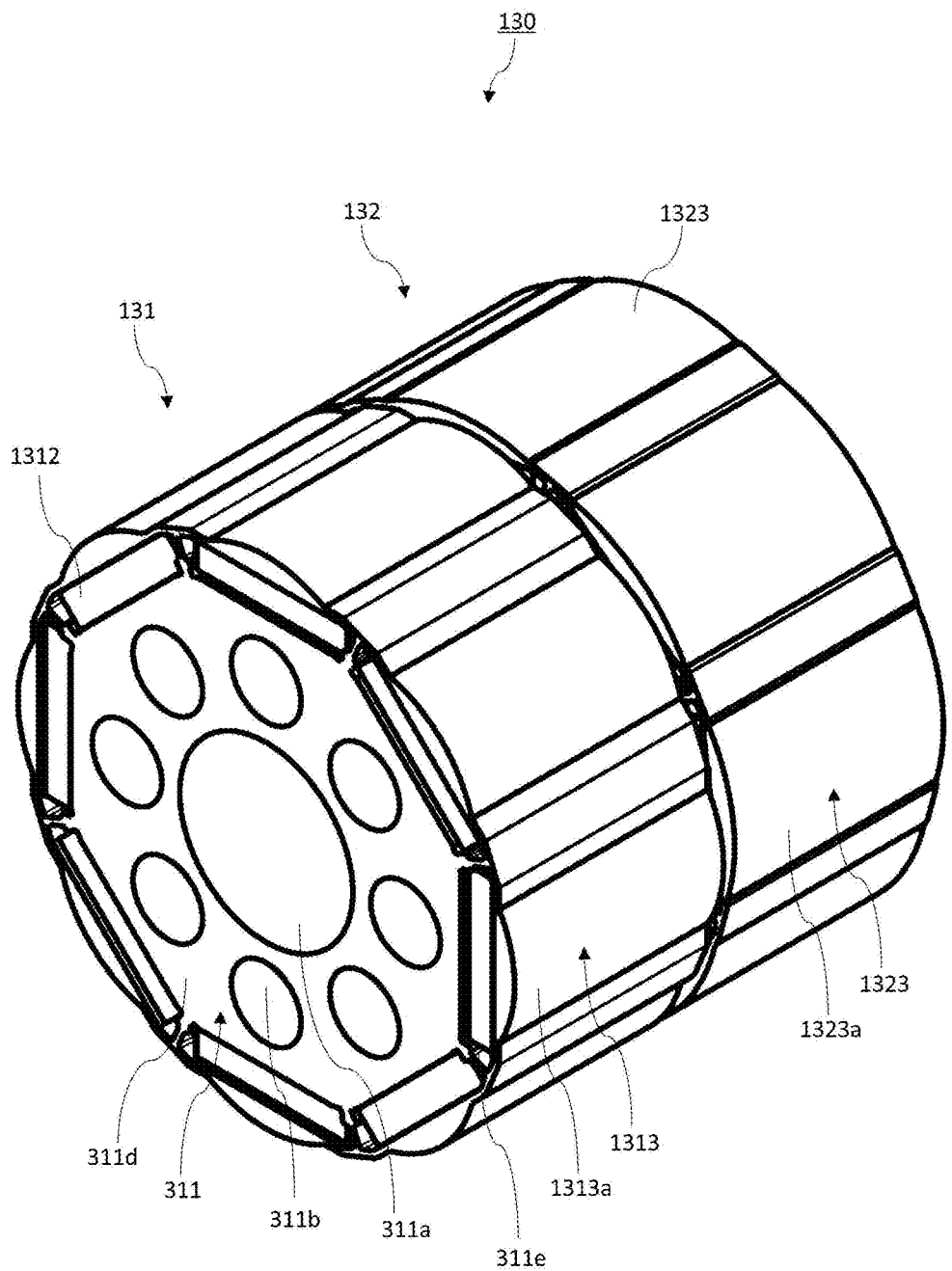
FIG. 6 is a perspective view of a rotor in a first modified example embodiment of the present disclosure.

FIG. 6 is a perspective view of a rotor 130 in one modified example according to the present invention. As shown in FIG. 6, the rotor 130 of the present modified example includes two rotating bodies, that is, a first rotating body 131 and a second rotating body 132, arranged along a central axis C. The first rotating body 131 is positioned above the second rotating body 132 in an axial direction, and the second rotating body 132 is positioned below the first rotating body 131 in the axial direction.

The first rotating body 131 includes a cylindrical shaped first rotor core 311 with the central axis C as a center thereof and first magnets 1312.

The first rotor core 311 includes a first inner side core 311d, a first outer side core 1313, and a first connection portion 311e. The first inner side core 311d is positioned further inward than the first magnet 1312 in a radial direction. The first outer side core 1313 is positioned further outward than the first magnet 1312 in the radial direction. The first outer side core 1313 includes a first outer side surface 1313a facing the stator 4. The first rotor core 311 includes the first connection portion 311e between the first inner side core 311d and the first outer side core 1313, which is configured to connect the first inner side core 311d and the first outer side core 1313 to each other. The first connection portion 311e is positioned between the first magnets 1312 arranged adjacent to each other in the circumferential direction.

The first rotating body 131 includes the first magnets 1312 between the first inner side core 311d and the first outer side core 1313. That is, the first rotor core 311 holds the first magnets 1312. The first magnet 1312 is in the state shown in FIG. 6 by being inserted into a through hole of the first rotor core 311 extending in the axial direction.

The first magnet 1312 is a permanent magnet having a rectangular parallelepiped shape. Since the first magnet 1312 has a rectangular parallelepiped shape, the first magnet 1312 may be manufactured relatively more easily and inexpensively than a magnet whose outer side surface is curved in a circular arc shape. Further, since it is not necessary to process surfaces of the magnet of the rectangular parallelepiped shape, the magnet may be manufactured with higher dimensional accuracy as compared with a case in which a plane surface is processed into a curved surface. Accordingly, a spacing distance between the rotor 130 and the stator 4 may be adjusted more accurately. Thus, variations in torque generated in the motor 1 including the rotor 130 may be suppressed.

The first outer side surface 1313a of the first rotating body 131 is curved in a circular arc shape when viewed in plan in a plane orthogonal to the axial direction. That is, the first outer side surface 1313a has a curved surface having a circular arc-shaped cross-section. The first outer side surface 1313a has a predetermined curvature radius R1.

The second rotating body 132 includes a second outer side core 1323 like the first rotating body 131. The second outer side core 1323 includes a second outer side surface 1323a facing the stator 4.

The second outer side surface 1323a of the second rotating body 132 is curved in a circular arc shape when viewed in plan in a plane orthogonal to the axial direction. That is, the second outer side surface 1323a has a curved surface having a circular arc-shaped cross-section. The second outer side surface 1323a has a predetermined curvature radius R2.

Positions of the first rotating body 131 and the second rotating body 132 in the circumferential direction are deviated from each other. Thus, as in the case of the rotor 3 of the example embodiment, cogging generated while driving the motor 1 including the rotor 130 may be reduced.

Further, the curvature radius R1 of the first outer side surface 1313a of the first rotating body 131 and the curvature radius R2 of the second outer side surface 1323a of the second rotating body 132 are different from each other. Accordingly, as in the example embodiment, it is possible to design such that a phase of a torque ripple generated in the first rotating body 131 is opposite to a phase of a torque ripple generated in the second rotating body 132. Thus, the torque ripples may be reduced.

The above-described rotor of the present invention may be applied not only to a so-called surface permanent magnet (SPM) motor as in the example embodiment but also to a so-called inner permanent magnet (IPM) motor as in the present modified example. However, even in a rotor used for either of the motors, the number of magnetic pole portions and the number of outer side surfaces of the magnet are the same in each rotating body. Further, the number of teeth included in the stator 4 and the number of magnetic pole portions are the same. Although the number of magnets is equal to the number of outer side surfaces in a case in which each magnet includes one magnetic pole portion, in a case in which the magnet constitutes a plurality of magnetic pole portions, the number of outer side surfaces is greater than the number of magnets. Further, when one magnetic pole portion is configured by a plurality of magnets, the number of outer side surfaces is smaller than the number of magnets. Further, the magnetic pole portion referred to herein includes a case in which the magnetic pole portion is configured by so-called pseudo salient poles in which a rotor core positioned between magnets adjacent to each other constitutes a magnetic pole. Further, the magnetic pole portion includes a case in which one magnetic pole portion is configured by a magnet group configured by one magnet or a plurality of magnets.

2-2. Second Modified Example

A rotor 230 of the present modified example is a rotor used for a so-called IPM motor as in the case of the rotor 130 of the first modified example, but a configuration of each rotating body is different. However, the configuration of the present modified example is also applicable to a rotor used for a so-called SPM motor.

Figure 7:
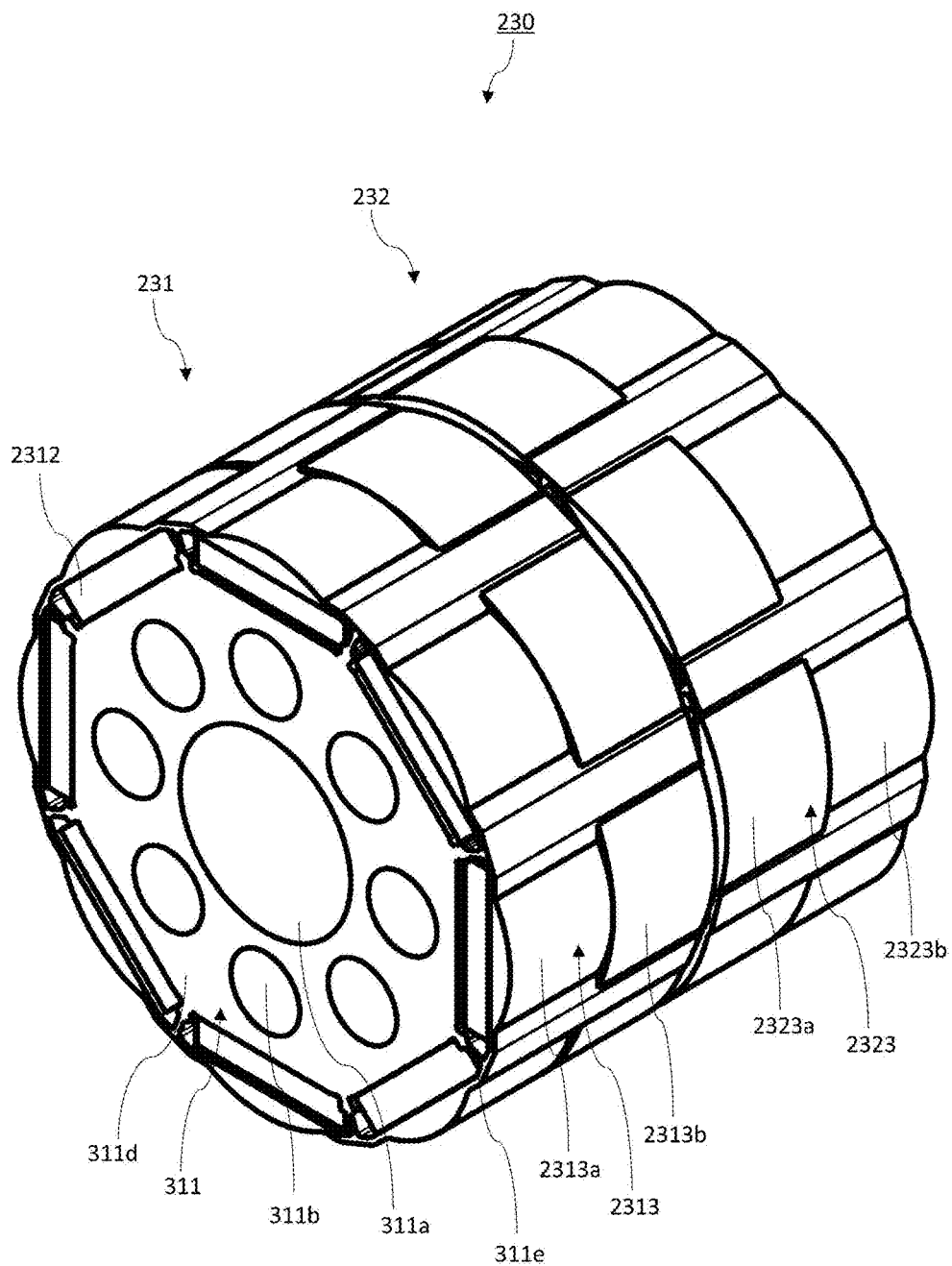
FIG. 7 is a perspective view of a rotor in a second modified example embodiment of the present disclosure.

FIG. 7 is a perspective view of the rotor 230 in one modified example according to the present invention. As shown in FIG. 7, the rotor 230 of the present modified example includes two rotating bodies, that is, a first rotating body 231 and a second rotating body 232, arranged along a central axis C. The first rotating body 231 is positioned above the second rotating body 232 in an axial direction, and the second rotating body 232 is positioned below the first rotating body 231 in the axial direction.

Positions of the first rotating body 231 and the second rotating body 232 in the circumferential direction are deviated from each other. Thus, as in the case of the rotor 3 of the example embodiment, cogging generated while driving the motor 1 including the rotor 230 may be reduced.

The first rotor core 311 holds first magnets 2312 having a rectangular parallelepiped shape and extending in the axial direction. A first outer side core 2313 is positioned on an outside of the first magnet 2312 in a radial direction.

In the first outer side core 2313, an outer side surface has different shapes on upper and lower sides in the axial direction. Specifically, the first outer side core 2313 includes a first outer side surface 2313a positioned on the upper side in the axial direction and a second outer side surface 2313b positioned on the lower side in the axial direction.

The first outer side surface 2313a is curved in a circular arc shape when viewed in plan in a plane orthogonal to the axial direction. That is, the first outer side surface 2313a has a curved surface having a circular arc-shaped cross-section. The first outer side surface 2313a has a predetermined curvature radius R1.

The second outer side surface 2313b is curved in a circular arc shape when viewed in plan in a plane orthogonal to the axial direction. That is, the second outer side surface 2313b has a curved surface having a circular arc-shaped cross-section. The second outer side surface 2313b has a predetermined curvature radius R2.

The second rotating body 232 has the same configuration as the first rotating body 231. A second outer side core 2323 of the second rotating body 232 includes a third outer side surface 2323a positioned on an upper side in the axial direction and a fourth outer side surface 2323b positioned on a lower side in the axial direction.

The third outer side surface 2323a and the fourth outer side surface 2323b are curved in a circular arc shape when viewed in plan in a plane orthogonal to the axial direction. That is, the third outer side surface 2323a and the fourth outer side surface 2323b have curved surfaces having a circular arc-shaped cross-section. The third outer side surface 2323a and the fourth outer side surface 2323b have predetermined curvature radii R2 and R1, respectively.

That is, the curvature radius of the fourth outer side surface 2323b is R1 equal to the curvature radius of the first outer side surface 2313a, and the curvature radius of the third outer side surface 2323a is R2 equal to the second outer side surface 2313b. The curvature radius R1 is smaller than the curvature radius R2. That is, the second outer side surface 2313b and the third outer side surface 2323a are more gently curved than the first outer side surface 2313a and the fourth outer side surface 2323b.

When the rotor 230 having such a configuration is adopted, the rotor 230 may be symmetrically configured in the axial direction. Thus, since the same torque ripple may be obtained regardless of which direction the motor 1 rotates, the configuration in which the torque ripples are stably suppressed independently of the rotational direction may be provided.

Further, in the rotor 230 of the present modified example, the central axis C, a curvature center of the first outer side surface 2313a, and a curvature center of the second outer side surface 2313b are arranged on the same line perpendicular to the central axis C. Further, the central axis C, a curvature center of the third outer side surface 2323a, and a curvature center of the fourth outer side surface 2323b are arranged on the same line perpendicular to the central axis C. The configuration in which the curvature centers are arranged on the same line as described above may suppress the flow of magnetic flux from becoming non-uniform in the circumferential direction. Thus, even in the configuration in which the shape of the first outer side surface 2313a is different from the shape of the outer side surface of the second outer side surface 2313b, stable magnetic characteristics may be obtained.

Further, a configuration may be allowed in which each of the first outer side surface 2313a, the second outer side surface 2313b, the third outer side surface 2323a, and the fourth outer side surface 2323b has a different curvature radius. In such a configuration, it is possible to expand a degree of freedom of design of the curvature radius of the outer side surface, and a configuration in which the torque ripples are easily suppressed may be provided. It is particularly useful when the motor 1 is configured to generate different torque in a forward direction and a reverse direction.

Further, in the present modified example, the configuration in which one rotating body includes the outer side surface having two different curvature radii in the axial direction is taken as an example, but a configuration in which one rotating body includes an outer side surface having three or more different curvature radii may be adopted.

2-3. Third Modified Example

A rotor 330 of the present modified example is a rotor used for a so-called SPM motor similar to the rotor 3 of the example embodiment but is different from the rotor 3 of the example embodiment in that the rotor 330 includes three rotating bodies.

Figure 8:
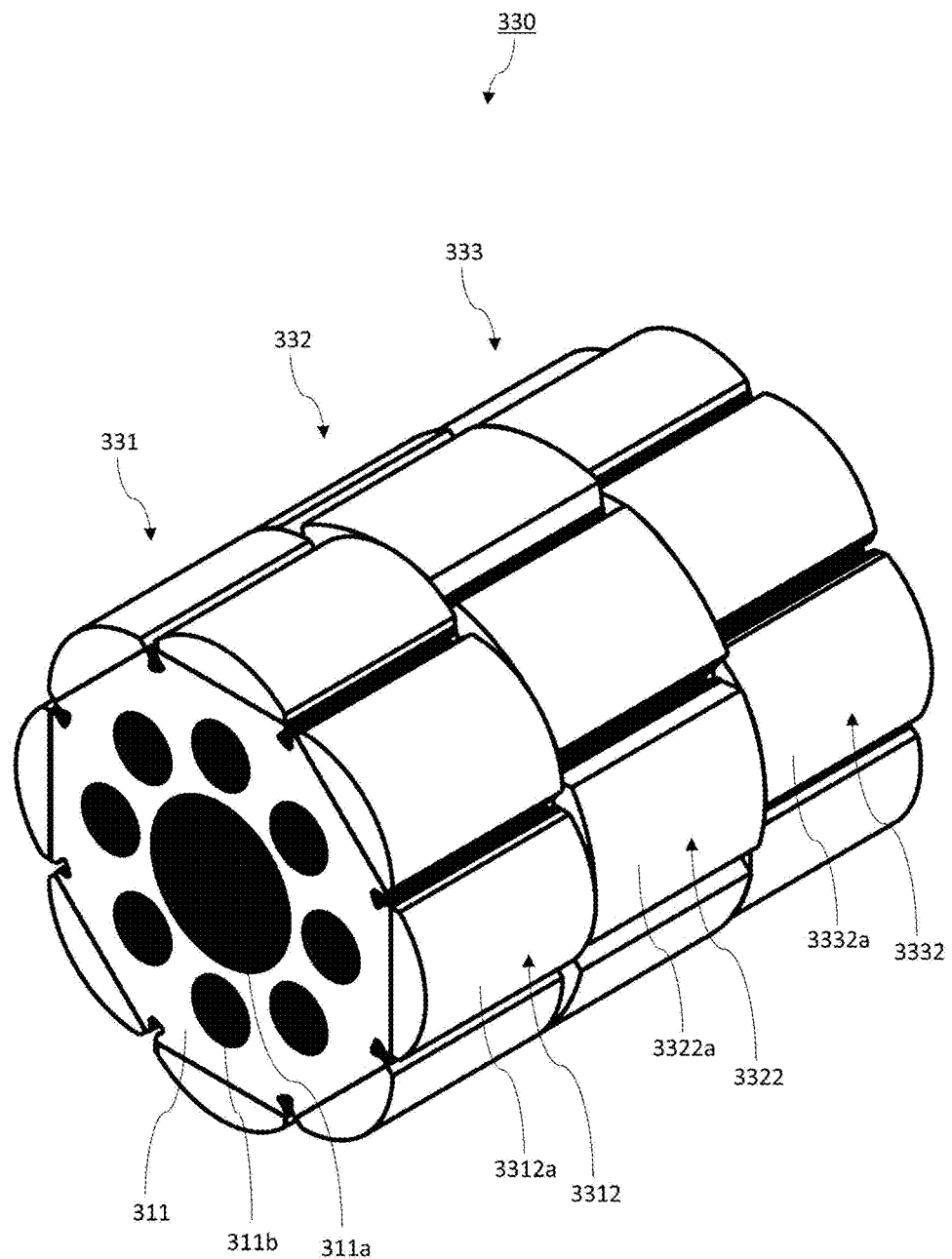
FIG. 8 is a perspective view of a rotor in a third modified example embodiment of the present disclosure.

FIG. 8 is a perspective view of the rotor 330 in one modified example according to the present invention. As shown in FIG. 8, the rotor 330 of the present modified example includes three rotating bodies, that is, a first rotating body 331, a second rotating body 332, and a third rotating body 333, arranged along a central axis C. The first rotating body 331 is positioned on a side upper than the second rotating body 332 and the third rotating body 333 in an axial direction. The second rotating body 332 is positioned on a side lower than the first rotating body 331 in the axial direction and upper than the third rotating body 333 in the axial direction. The third rotating body 333 is positioned on a side lower than the first rotating body 331 and the second rotating body 332 in the axial direction. That is, the second rotating body 332 is disposed at a position sandwiched by the first rotating body 331 and the third rotating body 333 in the axial direction.

Each of the first rotating body 331, the second rotating body 332, and the third rotating body 333 has a configuration similar to that of the first rotating body 31 of the example embodiment.

In the first rotating body 331, a plurality of first magnets 3312 arranged in a circumferential direction are disposed on an outer circumferential surface of a first rotor core 311. A first outer side surface 3312a of the first magnet 3312 is curved in a circular arc shape when viewed in plan in a plane orthogonal to the axial direction. The first outer side surface 3312a has a predetermined curvature radius R1.

In the second rotating body 332, a plurality of second magnets 3322 arranged in the circumferential direction are disposed on an outer circumferential surface of a second rotor core. A second outer side surface 3322a of the second magnet 3322 is curved in a circular arc shape when viewed in plan in a plane orthogonal to the axial direction. The second outer side surface 3322a has a predetermined curvature radius R2.

In the third rotating body 333, a plurality of third magnets 3332 arranged in the circumferential direction are disposed on an outer circumferential surface of a third rotor core. A third outer side surface 3332a of the third magnet 3332 is curved in a circular arc shape when viewed in plan in a plane orthogonal to the axial direction. The third outer side surface 3332a has a predetermined curvature radius R3.

Positions of the first rotating body 331, the second rotating body 332, and the third rotating body 333 in the circumferential direction are deviated from each other. Specifically, a positional deviation of the first rotating body 331 with respect to the second rotating body 332 in the circumferential direction in one rotational direction is smaller than the positional deviation of the first rotating body 331 with respect to the second rotating body 332 in the circumferential direction in another rotational direction. Also, a positional deviation of the second rotating body 332 with respect to the third rotating body 333 in the circumferential direction in one rotational direction is smaller than the positional deviation of the second rotating body 332 with respect to the third rotating body 333 in the circumferential direction in another rotational direction. More specifically, a positional deviation of the second rotating body 332 with respect to the first rotating body 331 in the circumferential direction is substantially equal to a positional deviation of the third rotating body 333 with respect to the second rotating body 332 in the circumferential direction. Torque ripples generated while driving the motor 1 including the rotor 330 may be suppressed more effectively by deviating the positions of the three rotating bodies in the circumferential direction from each other as described above.

Further, in order to reduce the torque ripples in the same manner regardless of the rotational direction, the curvature radii of the first outer side surface 3312a and the third outer side surface 3332a may be made substantially equal to each other.

Further, as described in the example embodiment, the cogging torque may be reduced more effectively by making the curvature radius of the outer side surface of the magnet that is one side in the circumferential direction in the rotational direction smaller than the curvature radius of the outer side surface of the magnet that is the other side in the circumferential direction. That is, the cogging torque may be reduced more effectively by making the curvature radius R1 of the first outer side surface 3312a and the third outer side surface 3332a smaller than the curvature radius R2 of the second outer side surface 3322a.

Further, there is a certain effect on the reduction of the torque ripples even in a configuration in which R2 is maximized among the curvature radius R1 of the first outer side surface 3312a, the curvature radius R2 of the second outer side surface 3322a, and the curvature radius R3 of the third outer side surface 3332a.

2-4. Fourth Modified Example

A rotor 430 of the present modified example is a rotor used for a so-called SPM motor similar to the rotor 3 of the example embodiment but is different from the example embodiment particularly in that a shape of an outer side surface of a magnet is different.

Figure 9:
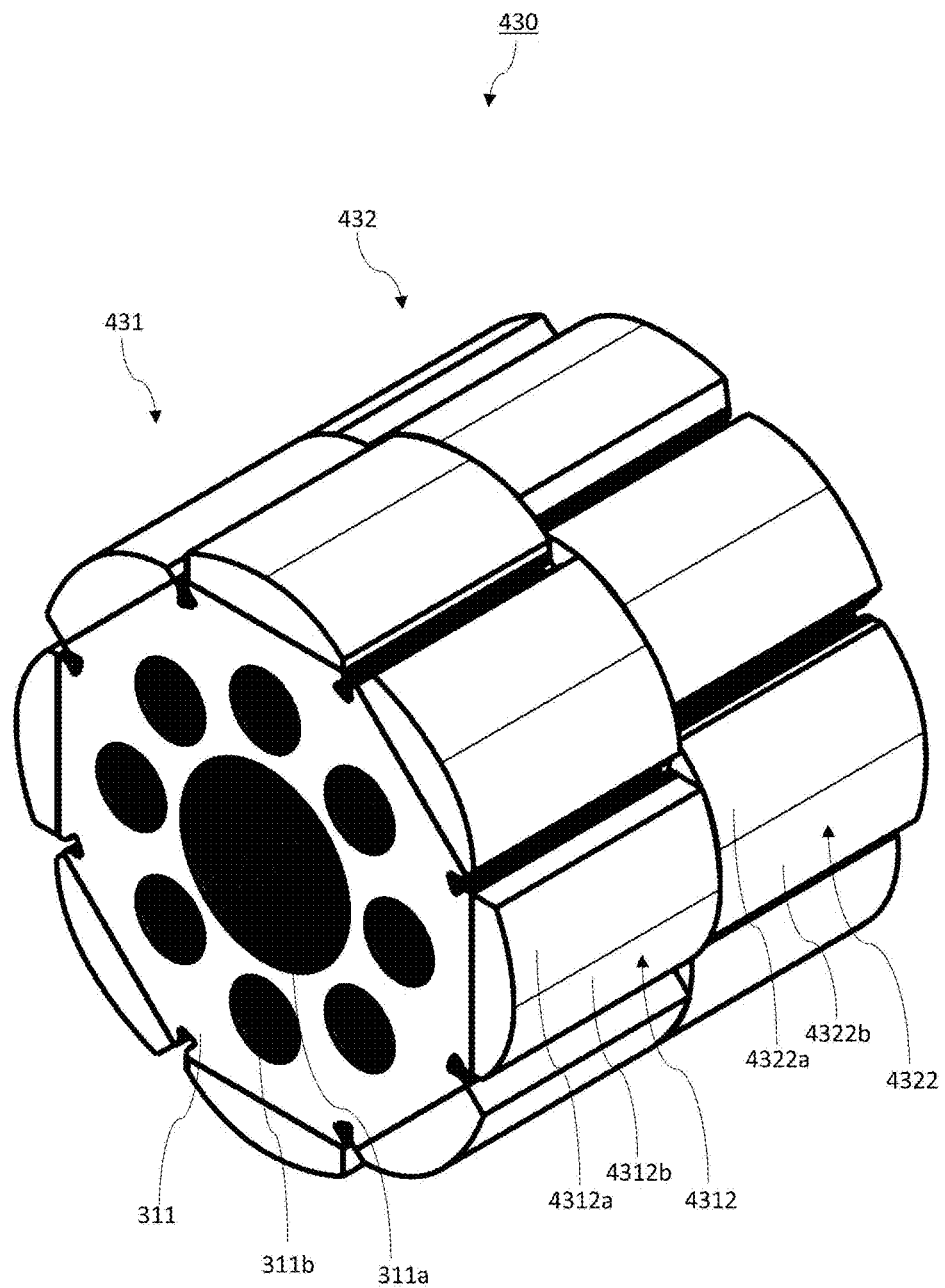
FIG. 9 is a perspective view of a rotor in a fourth modified example embodiment of the present disclosure.

FIG. 9 is a perspective view of the rotor 430 in one modified example according to the present invention. As shown in FIG. 9, the rotor 430 of the present modified example includes two rotating bodies, that is, a first rotating body 431 and a second rotating body 432, arranged along a central axis C. The first rotating body 431 is disposed above the second rotating body 432 in an axial direction, and the second rotating body 432 is positioned below the first rotating body 431 in the axial direction.

As shown in FIG. 9, the first rotating body 431 includes a first magnet 4312, and the second rotating body 432 includes a second magnet 4322.

The first magnet 4312 includes an outer side surface facing the stator 4. The outer side surface of the first magnet 4312 includes a first circular arc surface 4312a arranged on one side in a circumferential direction and a second circular arc surface 4312b arranged on the other side in the circumferential direction. The first circular arc surface 4312a has a curvature radius R1. The second circular arc surface 4312b has a curvature radius R2.

The second magnet 4322 includes an outer side surface facing the stator 4. The outer side surface of the second magnet 4322 includes a third circular arc surface 4322a arranged on one side in the circumferential direction and a fourth circular arc surface 4322b arranged on the other side in the circumferential direction. The third circular arc surface 4322a has a curvature radius R3. The fourth circular arc surface 4322b has a curvature radius R4.

When the rotor 430 having such a configuration is adopted, it is possible to reduce torque ripples during rotation of the motor 1 including the rotor 430.

In particular, in order to reduce the torque ripples to the same extent regardless of the rotational direction, the curvature radii of the first circular arc surface 4312a and the fourth circular arc surface 4322b may be made substantially equal to each other, and the curvature radii of the second circular arc surface 4312b and the third circular arc surface 4322a may be made substantially equal to each other.

Further, as described in the example embodiment, cogging torque may be reduced more effectively by making the curvature radius of the outer side surface of the magnet that is one side in the circumferential direction in the rotational direction smaller than the curvature radius of the outer side surface of the magnet that is the other side in the circumferential direction. That is, the curvature radii of the first circular arc surface 4312a and the fourth circular arc surface 4322b are set to R1, the curvature radii of the second circular arc surface 4312b and the third circular arc surface 4322a are set to R2, and the curvature radius R1 is made smaller than the curvature radius R2, thereby reducing the cogging torque more effectively.

2-5. Fifth Modified Example

A rotor 530 of the present modified example is similar to the rotor 330 of the third modified example, but the main difference is that lengths of rotating bodies in an axial direction are different from each other.

Figure 10:
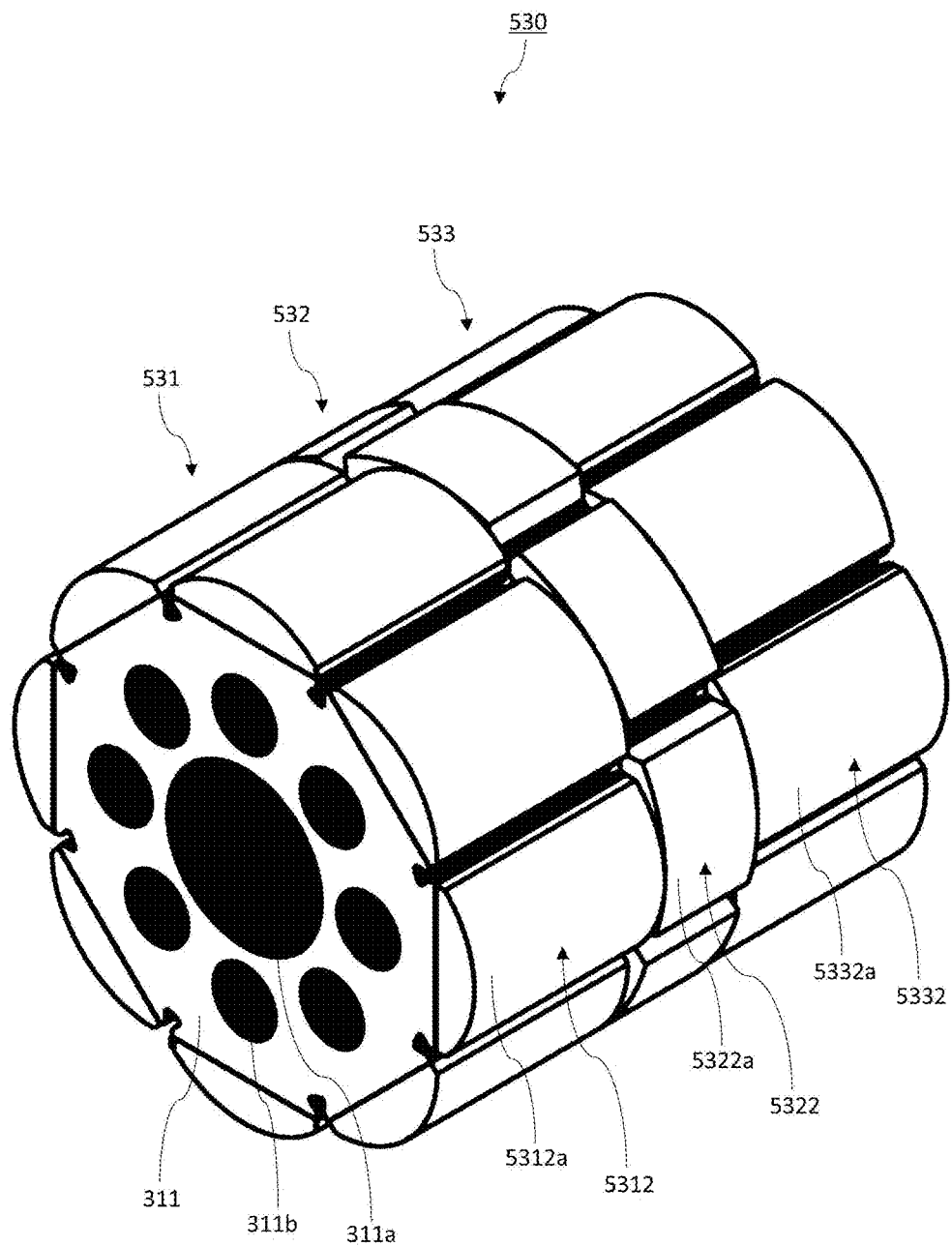
FIG. 10 is a perspective view of a rotor in a fifth modified example embodiment of the present disclosure.

FIG. 10 is a perspective view of the rotor 530 in one modified example according to the present invention. As shown in FIG. 10, the rotor 530 of the present modified example includes three rotating bodies of a first rotating body 531, a second rotating body 532, and a third rotating body 533 arranged along a central axis C. The first rotating body 531 is positioned on a side upper than the second rotating body 532 and the third rotating body 533 in the axial direction. The second rotating body 532 is positioned on a side lower than the first rotating body 531 in the axial direction and upper than the third rotating body 533 in the axial direction. The third rotating body 533 is positioned on a side lower than the first rotating body 531 and the second rotating body 532 in the axial direction. That is, the second rotating body 532 is disposed at a position sandwiched by the first rotating body 531 and the third rotating body 533 in the axial direction.

Lengths of the first rotating body 531 and the second rotating body 532 are different from each other in the axial direction. Also, lengths of the second rotating body 532 and the third rotating body 533 are different from each other in the axial direction. It is possible to prevent a plurality of rotating bodies from being attached erroneously in an assembly process of the motor 1 by changing lengths of the plurality of rotating bodies in the axial direction as described above. Further, when attaching a magnet to each rotating body, attaching an incorrect magnet may be prevented.

More specifically, in the rotor 530, the lengths of the first rotating body 531 and the third rotating body 533 in the axial direction are substantially the same. The lengths of the first rotating body 531 and the third rotating body 533 in the axial direction are longer than the length of the second rotating body 532 in the axial direction. Further, a length of a rotor core in the axial direction is approximately equal to lengths in the axial direction of a plurality of magnets arranged on an outer circumferential surface of the rotor core in each of the first rotating body 531, the second rotating body 532, and the third rotating body 533.

A plurality of first magnets 5312, second magnets 5322, and third magnets 5332 arranged in a circumferential direction are disposed on an outer circumferential surface of the rotor core of each of the first rotating body 531, the second rotating body 532, and the third rotating body 533, respectively. The first magnet 5312, the second magnet 5322, and the third magnet 5332 include a first outer side surface 5312a, a second outer side surface 5322a, and a third outer side surface 5332a, respectively, which are curved in a circular arc shape when viewed in plan in a plane orthogonal to the axial direction. The first outer side surface 5312a, the second outer side surface 5322a, and the third outer side surface 5332a have curvature radii R1, R2, and R3, respectively.

With the above-described configuration, the first rotating body 531, the second rotating body 532, and the third rotating body 533 may be configured to cancel generated torque ripples each other. Thus, the torque ripple during driving of the motor 1 including the rotor 530 may be reduced.

Further, the curvature radius R1 of the first outer side surface 5312a of the first rotating body 531 and the curvature radius R3 of the third outer side surface 5332a of the third rotating body 533 may be made to be smaller than the curvature radius R2 of the second outer side surface 5322a of the second rotating body 532. In this case, since the first rotating body 531 and the third rotating body 533, in which the curvature radii of the outer side surfaces thereof are small and thus cogging torque is small and robustness is high, are configured to be longer than the second rotating body 532 in the axial direction, a configuration is provided in which the cogging torque is smaller and magnetic characteristics are excellent.

Figure 11:
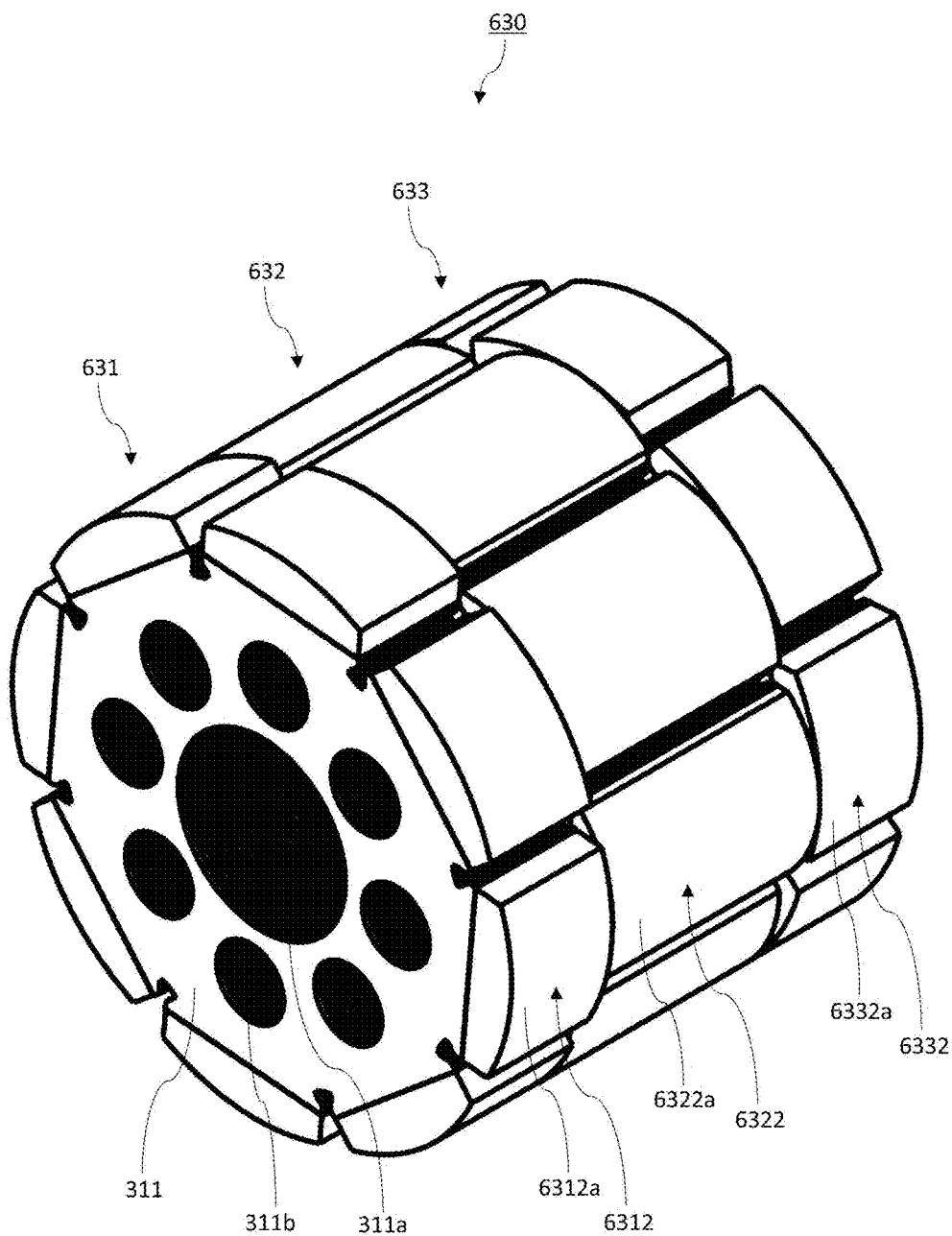
FIG. 11 is a perspective view of the rotor in the fifth modified example embodiment of the present disclosure.

Further, as shown in FIG. 11, a configuration may be adopted in which lengths of a first rotating body 631 and a third rotating body 633 in the axial direction are smaller than a length of a second rotating body 632 in the axial direction. Even in such a configuration, a certain effect may be obtained in the reduction of the cogging torque and the reduction of the torque ripples.

Further, the rotating bodies having different lengths in the axial direction are not necessarily applied only to the rotor having three rotating bodies and are also applicable to a rotor having two rotating bodies or a rotor having four or more rotating bodies. Even in this case, it is possible to configure the rotor having excellent magnetic characteristics.

Further, in the rotor 530, when the curvature radius of the first outer side surface 5312a and the curvature radius of the third outer side surface 5332a are set to R1 and the curvature radius of the second outer side surface 5322a is set to R2, a configuration in which the torque ripple is reduced regardless of the rotational direction may be provided.

Further, the cogging torque may be reduced more effectively by making the curvature radius of the outer side surface of the magnet that is one side in the circumferential direction in the rotational direction smaller than the curvature radius of the outer side surface of the magnet that is the other side in the circumferential direction. That is, the cogging torque may be reduced more effectively by making the curvature radius R1 of the first outer side surface 5312a and the third outer side surface 5332a smaller than the curvature radius R2 of the second outer side surface 5322a.

3. Others

Heretofore, the specific description of the example embodiment and the modified examples of the present invention has been made. In the above description, the description is merely one example embodiment, and the scope of the present invention is not limited to the one example embodiment and may be broadly interpreted in a range that can be understood by those skilled in the art. For example, the example embodiment and the modified examples may be implemented in combination with each other.

Specifically, the configurations of so-called IPM motors of the first modified example and the second modified example may be combined with the example embodiment or the other modified examples to configure each example embodiment as a configuration of a so-called IPM motor. In this case, the outer side surface of the rotating body is not the outer side surface of the magnet but an outer side surface of the rotor core.

Further, as in the second modified example, a configuration may be adopted in which the configuration, in which the outer side surfaces of the first rotating body 231 and the second rotating body 232 are different in the axial direction, is combined with any of the example embodiment or the third modified example to fifth modified example, and the like.

The combination of the above-described example embodiment and modified examples is merely one example, and various forms may be adopted by appropriately combining any of the example embodiment and the modified examples.

The number of rotating bodies included in the rotor does not necessarily have to be plural, and a configuration having one rotating body may be adopted. In this case, an effect similar to that of the configuration having the plurality of rotating bodies may be obtained by making a curvature radius of each outer side surface different in an upper side and a lower side in the axial direction.

The present invention may be used for, for example, a motor mounted on a vehicle such as for electric power steering, a pump, a compressor, or the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a first rotating body arranged along a central axis extending in a vertical direction; and
a second rotating body arranged along the central axis; wherein
the first rotating body includes a first rotor core having a cylindrical shape with the central axis as a center thereof and a plurality of first magnets arranged in a circumferential direction;
an outer side surface of the first rotating body includes a plurality of first outer side surfaces curved in a circular arc shape in a plan view and arranged in the circumferential direction, the first outer side surface being an outer side surface of the first magnet or an outer side surface of the first rotor core;
the second rotating body is positioned on a side lower in an axial direction than the first rotating body is positioned and includes a second rotor core having a cylindrical shape with the central axis as a center thereof and a plurality of second magnets arranged in the circumferential direction;
an outer side surface of the second rotating body includes a plurality of second outer side surfaces curved in a circular arc shape in a plan view and arranged in the circumferential direction, the second outer side surface being an outer side surface of the second magnet or an outer side surface of the second rotor core;
a curvature radius of the first outer side surface is different from a curvature radius of the second outer side surface; and
a total length of the first rotating body in the axial direction is different from a total length of the second rotating body in the axial direction.

2. The rotor of claim 1, wherein positions of the first rotating body and the second rotating body in the circumferential direction are deviated from each other.

3. A motor comprising:
a shaft, to which the rotor of claim 1 is attached, extending along the central axis in a vertical direction;
a bearing rotatably supporting the shaft;
a stator facing an outer side of the rotor in a radial direction; and
a housing accommodating the rotor and the stator.

4. The motor of claim 3, wherein a magnitude of a positional deviation of the first rotating body with respect to the second rotating body in the circumferential direction in a rotational direction of the rotor is smaller than a magnitude of a positional deviation of the first rotating body with respect to the second rotating body in the circumferential direction in a direction opposite to the rotational direction of the rotor.

5. The motor of claim 4, wherein a curvature radius of the first outer side surface is smaller than a curvature radius of the second outer side surface.

6. The rotor of claim 1, further comprising:
a third rotating body arranged along the central axis; wherein
the third rotating body is positioned on a side in an axial direction lower than the second rotating body and includes a third rotor core having a cylindrical shape with the central axis as a center thereof and a plurality of third magnets arranged in a circumferential direction;
an outer side surface of the third rotating body includes a plurality of third outer side surfaces curved in a circular arc shape in a plan view and arranged in the circumferential direction; and
the third outer side surface is an outer side surface of the third magnet or an outer side surface of the third rotor core.

7. The rotor of claim 6, wherein positions of the first rotating body, the second rotating body, and the third rotating body are deviated from each other in the circumferential direction.

8. The rotor of claim 6, wherein a total length of the first rotating body in the axial direction is different from a total length of the second rotating body in the axial direction, and a total length of the third rotating body in the axial direction is different from the total length of the second rotating body in the axial direction.

9. The rotor of claim 8, wherein the total lengths of the first rotating body and the third rotating body in the axial direction are the same, and the total lengths of the first rotating body and the third rotating body in the axial direction are longer than the total length of the second rotating body in the axial direction.

10. The rotor of claim 1, wherein a curvature center of the first outer side surface, a curvature center of the second outer side surface, and the central axis are at different positions in a plan view.

11. A motor comprising:
a shaft, to which the rotor of claim 6 is attached, extending along the central axis in a vertical direction;
a bearing rotatably supporting the shaft;
a stator facing an outer side of the rotor in a radial direction; and
a housing accommodating the rotor and the stator.

12. The motor of claim 11, wherein
a magnitude of a positional deviation of the first rotating body with respect to the second rotating body in a circumferential direction in a predetermined rotational direction is smaller than a magnitude of a positional deviation of the first rotating body with respect to the second rotating body in the circumferential direction in a direction opposite to the predetermined rotational direction; and a magnitude of a positional deviation of the second rotating body with respect to the third rotating body in the circumferential direction in the predetermined rotational direction is smaller than a magnitude of a positional deviation of the second rotating body with respect to the third rotating body in the circumferential direction in a direction opposite to the predetermined rotational direction.

13. The motor of claim 12, wherein a curvature radius of the first outer side surface is smaller than a curvature radius of the second outer side surface, and a curvature radius of the third outer side surface is smaller than the curvature radius of the second outer side surface.

14. The motor of claim 13, wherein in the predetermined rotational direction, a magnitude of a positional deviation of the second rotating body with respect to the first rotating body in the circumferential direction is the same as a magnitude of a positional deviation of the third rotating body with respect to the second rotating body in the circumferential direction; and a curvature radius of the surface of the third side member is equal or substantially equal to a curvature radius of the surface of the first side member.

15. A rotor comprising:

a first rotating body arranged in a central axis extending in a vertical direction; and a second rotating body arranged in the central axis; wherein the first rotating body includes a first rotor core having a cylindrical shape with the central axis as a center thereof and a plurality of first magnets arranged in a circumferential direction, and an outer side surface of the first rotating body includes a plurality of first outer side surfaces arranged in the circumferential direction and a plurality of second outer side surfaces positioned on a side lower than the first outer side surface in an axial direction and arranged in the circumferential direction, wherein the first outer side surface and the second outer side surface are an outer side surface of the first magnet or an outer side surface of the first rotor core;

the second rotating body is positioned on a side lower in the axial direction than the first rotating body and includes a second rotor core having a cylindrical shape with the central axis as a center thereof and a plurality of second magnets arranged in the circumferential direction;

an outer side surface of the second rotating body includes a plurality of third outer side surfaces arranged in the circumferential direction and a plurality of fourth outer side surfaces positioned on a side lower than the third outer side surface in the axial direction and arranged in the circumferential direction, the third outer side surface and the fourth outer side surface being an outer side surface of the second magnet or an outer side surface of the second rotor core;

a curvature radius of the first outer side surface is different from a curvature radius of the second outer side surface, and a curvature radius of the third outer side surface is different from a curvature radius of the fourth outer side surface.

16. The rotor of claim 15, wherein the curvature radius of the first outer side surface is equal or substantially equal to the curvature radius of the third outer side surface, and the curvature radius of the second outer side surface is equal or substantially equal to the curvature radius of the fourth outer side surface.

17. The rotor of claim 15, wherein positions of the first rotating body and the second rotating body in the circumferential direction are deviated from each other.

18. The rotor of claim 15, wherein the central axis, a curvature center of the first outer side surface, and a curvature center of the second outer side surface are arranged on a same line in a plan view; and the central axis, a curvature center of the third outer side surface, and a curvature center of the fourth outer side surface are arranged on a same line in a plan view.

19. The rotor of claim 15, wherein a curvature center of the first outer side surface, a curvature center of the second outer side surface, and the central axis are at different positions in a plan view, and a curvature center of the third outer side surface, a curvature center of the fourth outer side surface, and the central axis are at different positions in a plan view.

* * * * *